Oct. 8, 1957 R. MANNAIONI 2,808,598
SCREW THREAD CUTTING LATHE
Filed Oct. 26, 1955 5 Sheets-Sheet 1
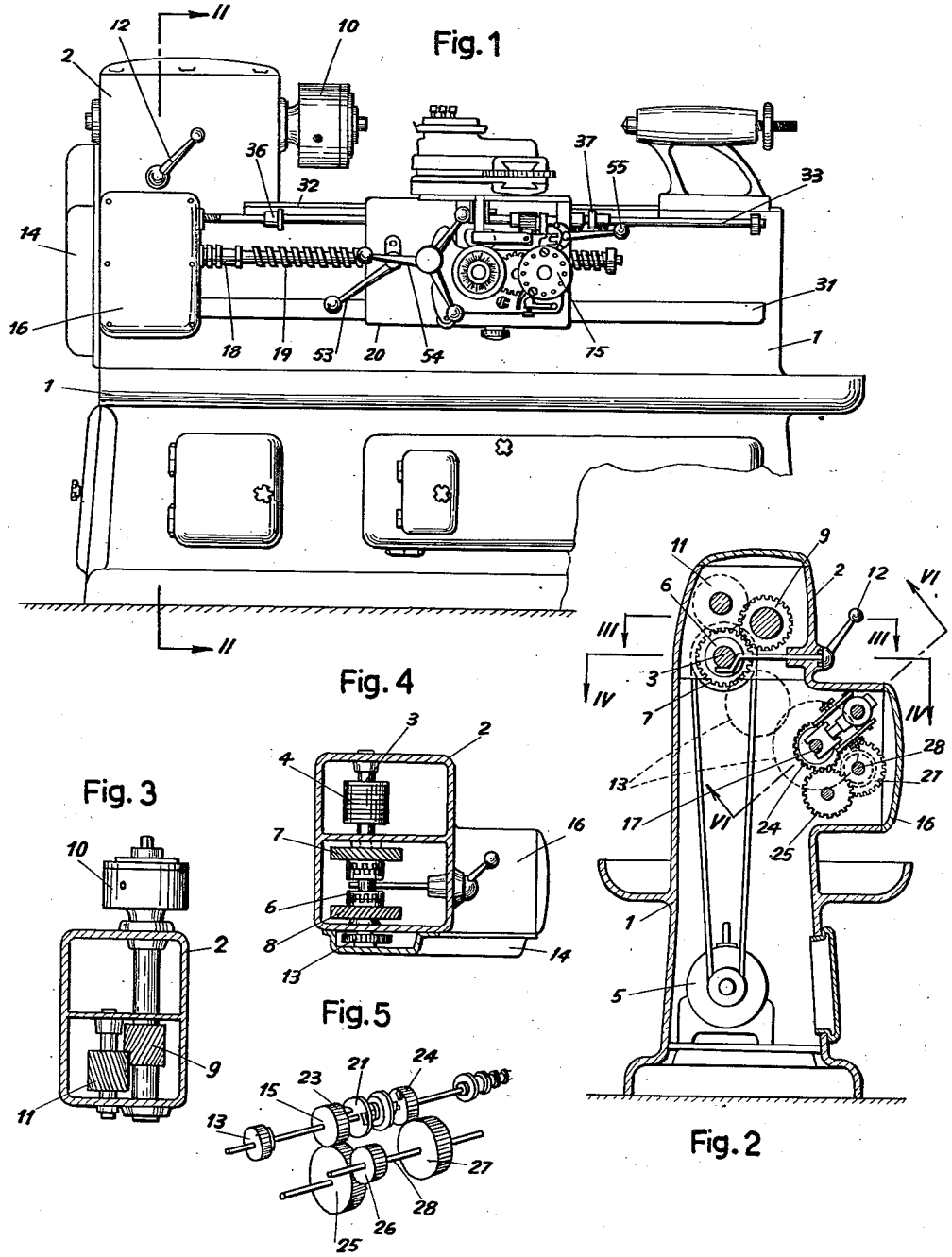
INVENTOR:
RIGHETTO MANNAIONI
BY
Richardson, David and Nordon
ATTORNEYS Oct. 8, 1957 — R. MANNAIONI — 2,808,598
SCREW THREAD CUTTING LATHE
Filed Oct. 26, 1955 — 5 Sheets-Sheet 2

INVENTOR:
RIGHETTO MANNAIONI
BY
Richardson, David and Nordon
ATTORNEYS

Oct. 8, 1957

R. MANNAIONI 2,808,598

SCREW THREAD CUTTING LATHE

Filed Oct. 26, 1955

INVENTOR:
RIGHETTO MANNAIONI
BY
Richardson, David and Nordon
ATTORNEYS

Oct. 8, 1957
R. MANNAIONI
2,808,598
SCREW THREAD CUTTING LATHE
Filed Oct. 26, 1955
5 Sheets-Sheet 4
Fig.14
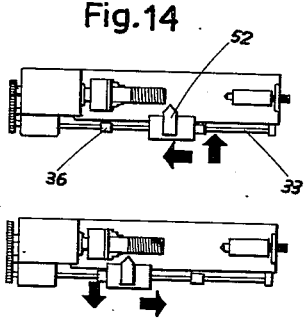
Fig.15
Fig.16
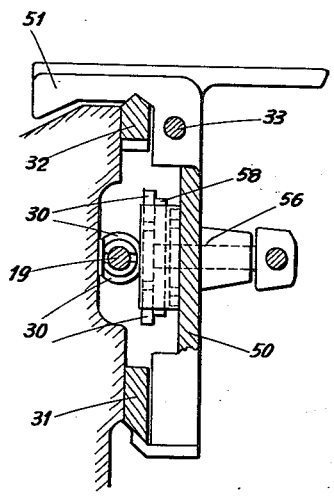
Fig.17
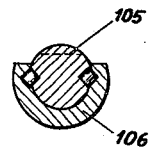
Fig.18
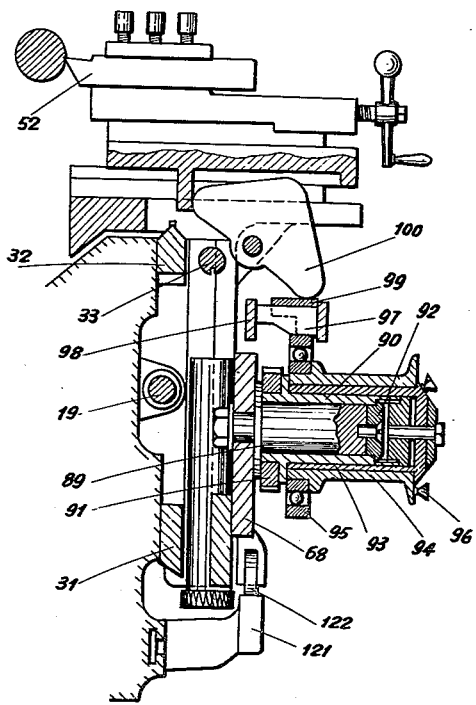
Fig.19
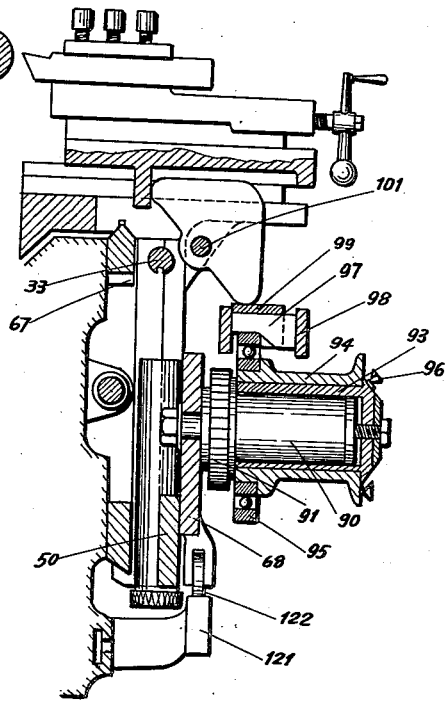
INVENTOR:
RIGHETTO MANNAIONI
BY
Richardson, David and Nordon
ATTORNEYS

United States Patent Office 2,808,598
Patented Oct. 8, 1957

2,808,598

SCREW THREAD CUTTING LATHE

Righetto Mannaioni, Florence, Italy

Application October 26, 1955, Serial No. 542,979

Claims priority, application Italy March 6, 1951

5 Claims. (Cl. 10—101)

The present invention relates to automatic lathes, and more particularly to tool displacement means for use with automatic lathes which are suitable for thread cutting.

The present application is a cointinuation-in-part of my application Serial No. 242,464 filed on August 18, 1951.

Generally, the invention comprises tool displacement mechanism for use with a lathe bed having a longitudinal bed way, a work spindle, a chuck for holding a workpiece mounted on the spindle, a lead screw for moving a tool carriage along the bed way; the tool displacement means including reversible gearing for driving the lead screw at slow speed in one direction during a working cut and at high speed during the rapid traverse return movement of the carriage, a cross slide with a tool holder mounted on the carriage, a feeding device arranged to advance or withdraw the tool from the work, and a control rod or bar extending parallel to the bed way and having a high pitch helical thread at one end, the bar being longitudinally moved by the carriage at each limit of its travel, a clutch controlling the reversible gearing and operated by the bar at each limit of carriage travel; and a tool control device operated by the rotation of the control bar in one direction at the beginning of the rapid traverse return of the carriage to withdraw the tool and operated by the rotation of the control bar in the opposite direction at the beginning of the cutting movement of the carriage to advance the tool for cutting engagement with the workpiece the amount of each advance being incrementally greater for successive cuts, together with means for stopping the lathe and resetting the tool control device after a predetermined total depth of cut has been attained.

It is among the objects of the invention to provide an automatic lathe which is adjustable for the accommodation of workpieces of different lengths and for different total depths of cut.

A further object of the invention is to provide an automatic lathe in which the depth of each individual cut may be conveniently adjusted, together with resettable counting mechanism for adjustment of the total number of cuts constituting the total depth of cut.

Another object of the invention is to provide an automatic lathe of this character in which automatic tool relief, or withdrawal of the tool from the work takes place after the completion of each individual cut, the withdrawal taking place each time at uniformly high speed and being accompanied by an accurately synchronized rapid traverse return movement of the tool carriage to its initial position for the beginning of another cut.

Still another object of the invention is to provide an automatic lathe in which a single motor or other power source takes care of all of the power requirements of the lathe including both the cutting and automatic operation mechanisms.

Still another object of the invention is to provide a lathe having an automatic stop which operates when a desired preset total depth of cut has been attained.

A further object of the invention is to provide a lathe of this character in which a double eccentric is used to determine the depth of successive individual cuts, the double eccentric being advanced by a ratchet mechanism through a predetermined angular distance at each cut. One of the eccentrics is so arranged that the depth of successive individual cuts decreases progressively as the preset total depth is approached. The other of the double eccentrics controls the radius of eccentricity of the first eccentric so that the magnitude of the depth of the individual cuts may be adjusted at will.

A further object of the invention is to provide a control bar which is actuated by the carriage at each limit of its travel, the control bar being provided at one end with a helical thread of high pitch. This thread causes rotation of the bar in one direction at the beginning of the cutting movement of the carriage thereby causing advance of the tool toward the work, and at the same time starts the slow speed movement of the carriage for the cutting movement of the tool. At the end of the cutting movement, the control bar is moved longitudinally in the opposite direction, starting the feed screw rotating at high speed for the rapid traverse return movement of the carriage and at the same time the helical thread rotates the bar in the opposite direction to withdraw the tool from the work during the rapid traverse return movement of the carriage.

Other and further objects will become apparent upon reading the following specification together with the accompanying drawings forming a part hereof.

Referring to the drawings:

Figure 1 is a front view in elevation of a lathe embodying the invention, part of the base of the lathe being omitted.

Figure 2 is an end sectional view in elevation taken along the line II—II of Figure 1, looking in the direction of the arrows.

Figure 3 is a plan sectional view taken along the line III—III of Figure 2.

Figure 4 is a plan sectional view taken along the line IV—IV of Figure 2.

Figure 5 is a schematic perspective view of the clutch and gearing which control the speed and direction of rotation of the lead screw.

Figure 6:
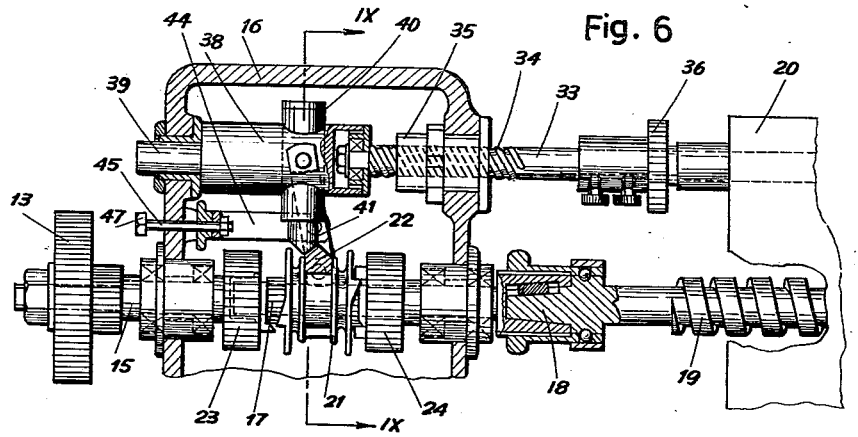

Figure 6 in an enlarged fragmentary sectional view taken along the line VI—VI of Figure 2 looking in the direction of the arrows and showing the lead screw control mechanism in the position for rapid traverse return movement of the carriage.

Figure 7:
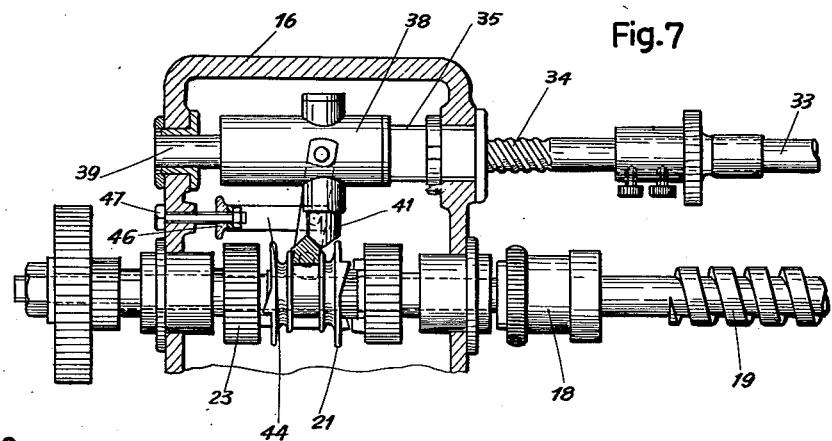

Figure 7 is a view similar to Figure 6, with the lead screw control mechanism shown in the position for slow movement of the carriage during cutting operation of the lathe.

Figure 8:
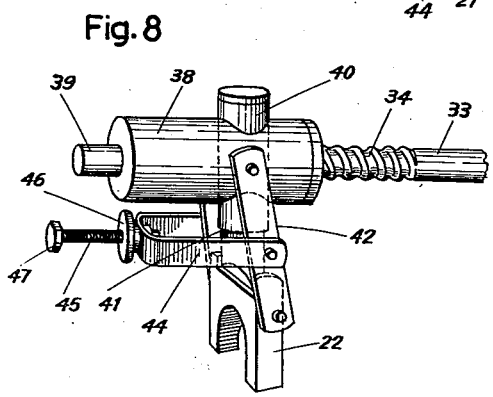

Figure 8 is a perspective view of a detail of the lead screw control mechanism shown in Figures 6 and 7.

Figure 9:
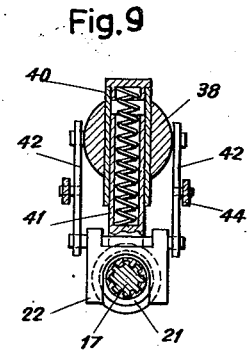

Figure 9 is a sectional view taken along the line IX—IX of Figure 6, looking in the direction of the arrows.

Figure 10:
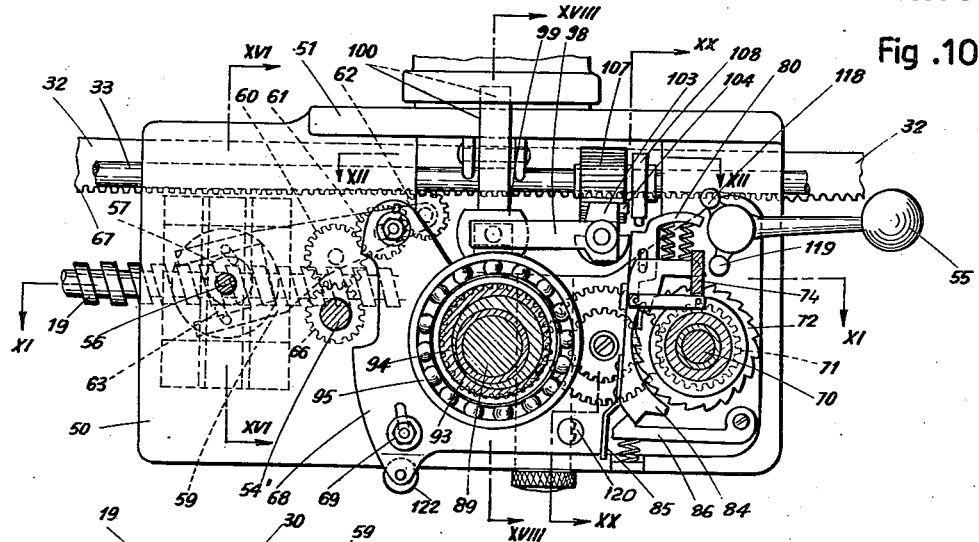

Figure 10 is an elevational view of the apron mechanism, partly broken away.

Figure 11:
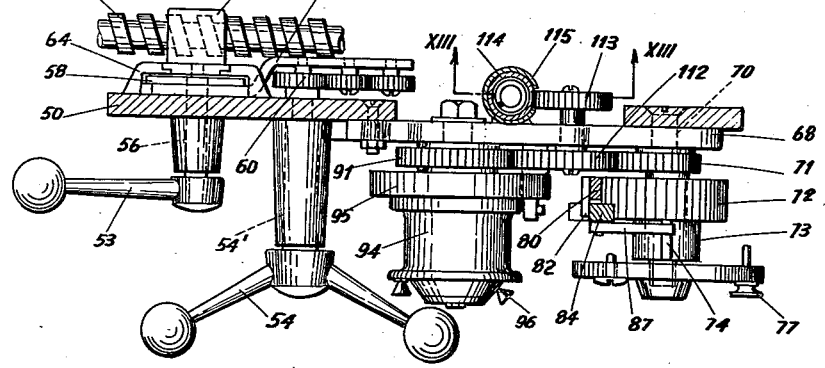

Figure 11 is a plan sectional view taken along the line XI—XI of Figure 10.

Figure 12:
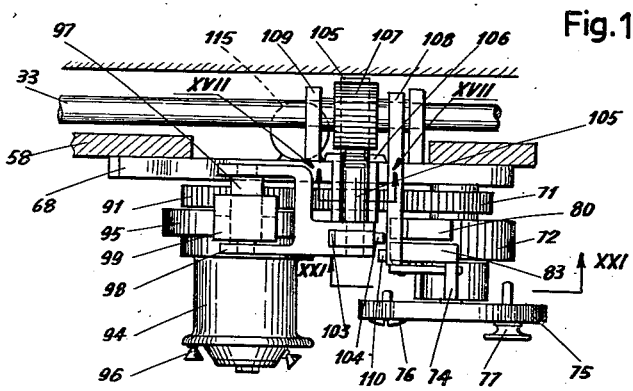

Figure 12 is a plan sectional view taken along the line XII—XII of Figure 10.

Figure 13:
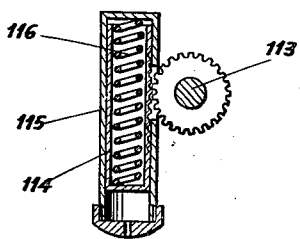

Figure 13 is a sectional view in elevation of a detail of a ratchet return spring unit of the apron mechanism, taken along the line XIII—XIII of Figure 11, looking in the direction of the arrows.

Figure 14 shows diagrammatically the directions of motion of the cutting tool and of the carriage at the beginning of the slow motion of the carriage for taking a cut.

Figure 15 is similar to Figure 14, showing the directions of motion of the cutting tool and of the carriage at the beginning of the rapid traverse return movement of the carriage.

Figure 16 is a sectional view in elevation of a split nut carriage release mechanism taken along the line XVI—XVI in Figure 10, looking in the direction of the arrows.

Figure 17 is an enlarged sectional view in elevation of a portion of the tool control mechanism of the apron taken along the line XVII—XVII in Figure 12, looking in the direction of the arrows.

Figure 18 is a sectional view in elevation of the tool feeding mechanism taken along the line XVIII—XVIII in Figure 10, looking in the direction of the arrows, with the cutting tool advanced for engagement with a workpiece.

Figure 19 is a view similar to Figure 18 with the cutting tool retracted for rapid traverse return movement of the carriage.

Figure 20:
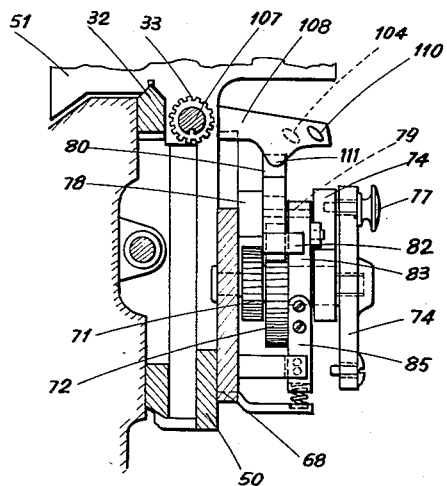

Figure 20 is a sectional view in elevation of a portion of the tool feeding mechanism taken along the line XX—XX in Figure 10, the cutting tool being in engagement with the workpiece.

Figure 21:
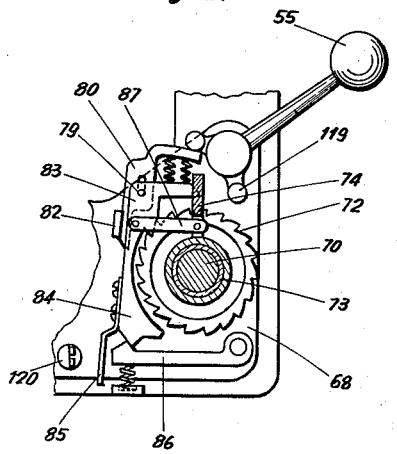

Figure 21 is a fragmentary sectional view in elevation taken along the line XXI—XXI of Figure 12 showing the tool advancing ratchet mechanism manually disengaged.

Figure 22:
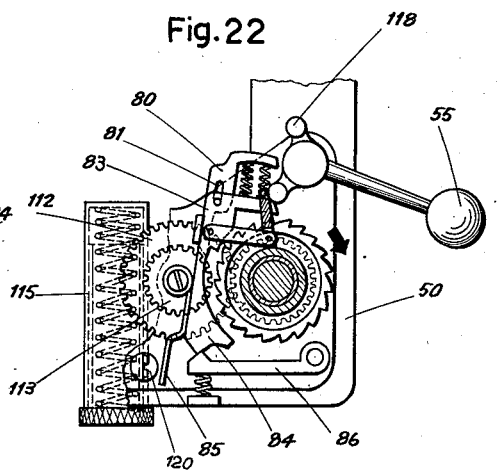

Figure 22 is a view similar to Figure 21 showing the tool advancing ratchet mechanism in its manually reset position.

Figure 23:
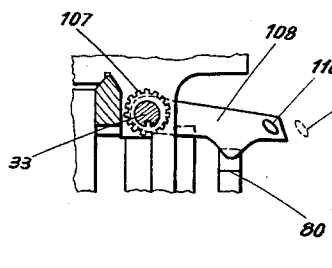

Figure 23 is a fragmentary sectional view similar to Figure 20, the tool being withdrawn from the workpiece.

Referring to Figs. 1 to 4, the lathe comprises a housing 1 of which the upper left hand portion 2 contains reversible gearing for turning the workpiece. A horizontally extending shaft 3 has a pulley 4 fixed thereon which is belt driven by a motor 5 or any other suitable source of power. A toothed clutch member 6 is splined on shaft 3 and is slidable therealong for selective engagement with either gear 7 or gear 8, the gears 7 and 8 being freely revoluble on shaft 3. Gear 7 meshes with a gear 9 which is fixed on a shaft which carries a chuck 10; the chuck 10 being adapted to receive a workpiece. Gear 8 meshes with an idler gear 11 which in turn meshes with gear 9 to drive the chuck 10 in the opposite direction. The position of clutch member 6 may be determined by means of a manual control lever 12 which thus controls the direction of rotation of chuck 10. If desired, a variable speed drive may be included between the motor 5 and shaft 3.

Shaft 3, through suitable gearing 13 disposed in the end housing 14, drives a shaft 15 (Fig. 6) in feed box 16. Shaft 15 is in axial alignment with a further shaft 17 which, through a coupling 18, drives the lead screw 19. Lead screw 19 moves the carriage 20.

A double faced single tooth clutch member 21 is splined on shaft 17 and is slidable therealong by a fork 22 for selective engagement with either gear 23 or gear 24, each of which is provided with a single tooth arranged to be driven by clutch member 21. Gear 23 is fixed on shaft 15 and gear 24 is freely rotatably mounted on shaft 17.

Clutch member 21, when in engagement with gear 23, drives shaft 17 and lead screw 19 directly at slow speed for causing slow speed movement of carriage 20 during each cut from right to left as viewed in Fig. 1 or as shown by the leftwardly directed arrow in Fig. 14.

The gear 24, which is provided with a laterally projecting tooth for engagement with clutch member 21, is driven (Fig. 5) in the opposite direction from gear 23 through high speed ratio gearing comprising the idler gear 25 which meshes with gear 23, the pinion 26 meshing with idler gear 25, the shaft 28 to which pinion 26 is fixed, and gear 27 also fixed to shaft 28 which latter gear meshes with gear 24. Thus, when clutch member 21 is moved into position for engagement with gear 24 the lead screw 19 is driven at relatively high speed for the rapid traverse return motion of carriage 20.

The single tooth clutch arrangement which causes clutch member 21 to be driven by gear 23 for the slow leftward movement of carriage 20 during each cut, assures that the beginning of each slow speed movement of carriage 20 will always start at the same angular position of lead screw 19. In this manner, the cutting tool will always engage the workpiece to follow the same thread cutting path as that cut during the immediately preceding slow speed movement of carriage 20.

The carriage 20 is provided with a split nut 30 (Figs. 11 and 16) which is controlled by a manually operable lever 53 as explained in greater detail below. The split nut 30 is engageable with and disengageable from the lead screw 19 under the control of lever 53.

The carriage 20 moves on a bed way comprising the parallel rails 31 and 32 (Fig. 16). A control rod 33, longitudinally grooved to be of non-circular cross-section, passes through the apron of the carriage. At one end, control rod 33 has a high pitch helical thread 34 (Figs. 6, 7 and 8) formed thereon which engages a fixed interiorly threaded bushing 35 mounted in a wall of the feed box 16. Two stop dogs 36 and 37 (Fig. 1) are adjustably positioned at control rod 33 on opposite sides of carriage 20 and the positions of the stop dogs 36 and 37 determine the limits of travel of the carriage 20, being alternately engaged thereby.

The carriage reversal is controlled by a cylinder 38 (Figs. 6, 7 and 8) disposed in feed box 16 and which is rotatably connected to and moves longitudinally with control rod 33, an extension 39 of cylinder 38 being axially aligned with control rod 33 and longitudinally movable through the end wall of feed box 16. Intermediate its ends cylinder 38 is provided with a transversely extending hollow tube 40 in which a spring pressed plunger 41 is slidably disposed, the plunger 41 being provided with a wedge-shaped free end. A pair of depending lateral links 42 is mounted on opposite sides of cylinder 38 and the lower ends of links 42 are pivotally connected to clutch actuating fork 22. The wedge-shaped free end of spring-pressed plunger 41 engages a similarly wedge-shaped upper surface on fork 22, thereby yieldingly urging fork 22 to slide clutch member 21 either into engagement with gear 23 or gear 24, there being no neutral position.

The links 42 are pivotally connected intermediate their ends to a horizontally extending yoke 44 which is provided with an adjustable threaded stop member 45 which passes freely through a wall of the feed box 16. Stop member 45 is provided with a knurled lock nut 46 which bears against yoke 44 and its outer end is provided with a hexagonal head 47. Stop member 45 may thus be adjusted to determine the limits of travel of the fork 22.

At the end of the rapid traverse return movement of carriage 20, moving from left to right as viewed in Fig. 1, stop dog 37 is engaged, thereby urging control rod 33 to the right. This causes the wedge-shaped free end of spring pressed plunger 41 to ride over the wedge-shaped upper surface of fork 22 from the position shown in Fig. 6 to the position shown in Fig. 7, thereby snapping clutch member 21 out of engagement with gear 24 and into engagement with gear 23 to begin the slow movement of the carriage for the next cutting passage of the tool. As previously noted, during the cutting operation, the carriage moves from right to left.

At the end of the cutting operation, carriage 20 engages stop dog 36, forcing control rod 33 to the left and thereby snapping fork 22 from the position shown in Fig. 7 to the position shown in Fig. 6 for the rapid traverse return movement of the carriage.

The carriage 20 comprises a front vertical apron 50 (Fig. 10) and a horizontal portion 51, the latter resting on the rails 31 and 32 of the bed way (Fig. 16). The horizontal portion 51 carries the usual cross slide upon which a cutting tool 52 (Figs. 18 and 19) is shown clamped.

The manually operable control lever 53 (Figs. 10 and 11) which engages and disengages split nut 30, is mounted on apron 50. Also mounted on apron 50 is the three-armed manual traverse handle 54 which is fixed to a shaft 54'. A manual ratchet control lever 55 is also mounted on apron 50.

The split nut control lever 53 is fixed to a shaft 56 which also carries a circular eccentric cam 57 and a circular plate 58. The cam 57 engages a fork 59 upon which a series of meshing gears 60—61—62 is mounted, the fork 59 being pivoted upon the same shaft as the gear 60. The circular plate 58 is provided with spiral slots or grooves 63. Each half of the split nut 30 carries a pin which engages one of the spiral grooves 63. The two halves of split nut 30 are vertically slidable in dovetail grooves (see Fig. 11) formed in the bracket 64.

The shaft 54' upon which the manual traverse handle 54 is mounted, carries a gear 66 which meshes with the gear 60 on fork 59. When split nut control lever 53 is lowered, or turned in a counterclockwise direction the two halves of the split nut 30 are brought into engagement with the feed screw 19. At the same time, the left end of fork 59 is raised by eccentric cam 57, and pivoting about the shaft of gear 60, lowers gear 62 so that it is disengaged from a stationary rack 67 formed on the under side of bed way rail 32. In this position of the split nut control lever 53, the movement of the carriage is under the control of lead screw 19.

When split nut control lever 53 is raised, or turned in a clockwise direction, so that the parts are in the position shown in Fig. 10, the two halves of the split nut 30 are moved apart so that the carriage 20 is disengaged from lead screw 19. At the same time, the left hand end of fork 59 is lowered by eccentric cam 57 and the right hand end of fork 59 is raised, bringing gear 62 into mesh with the rack 67. Rotation of the three-armed manual traverse handle 54 will then cause movement of the carriage through the gearing 66—60—61—62.

A plate 68 is mounted on apron 50 and is held in position by bolts 69 which pass through oversize holes in plate 68 permitting movement of plate 68 about pivot pin 70 when the bolts 69 are loosened. Pivot pin 70 is fixed to apron 50 and extends outwardly therefrom.

Pivot pin 70 carries a gear 71 and a ratchet wheel 72 which are fixed to each other, together with a freely revoluble collar 73 which has a radially projecting arm 74. Pivot pin 70 also carries the perforated wheel 75. A fixed stop pin 76 is disposed in one of the holes of wheel 75 and a movable stop pin 77 may be selectively disposed in any desired one of the holes in accordance with the total number of cuts to be taken for a particular lathe operation. The perforated wheel 75 is fixed to the gear 71 and ratchet wheel 72 for movement therewith.

A pivot pin 79 secured to plate 68 (Fig. 21) supports a ratchet advancing pawl 80 passing through a vertically elongated hole 81 therein. On the back of ratchet advancing pawl 80 a laterally extending projection 82 is formed which engages the back of a ratchet retaining pawl 83 which is separately pivotally mounted on pivot pin 79 adjacent to the ratchet advancing pawl 80. Pawl 83, at its lower end portion 84 carries an electrical contact finger 85 whose purpose is to control a stopping circuit for the motor 5 after completion of the final cut, as hereinafter described. An upwardly spring pressed lever 86 is pivoted to plate 50 and at its free end is provided with an inverted V-shaped surface which bears against a surface of complementary shape at the lower end 84 of the ratchet retaining pawl 83. Lever 86 thus either urges ratchet retaining pawl 83 into engagement with one of the teeth of ratchet wheel 72 or else holds pawl 83 in its disengaged position as shown in Fig. 22. A link 87 connects retaining pawl 83 with the radially projecting arm 74 carried by collar 73, so that upon counterclockwise rotation of collar 73 and arm 74, the retaining pawl 83 and the ratchet advancing pawl 80 will be both disengaged from ratchet wheel 72 and will permit it to return to its initial position.

Centrally mounted on plate 68 is an outwardly extending fixed shaft 89. Freely revolubly mounted on shaft 89 is a cylindrical sleeve 90 (Figs. 18 and 19) which has a gear 91 fixed thereon. Sleeve 90 is held in position on shaft 89 by a shouldered disc 92. Assembled on sleeve 90 for rotation therewith are two mutually engaging eccentric sleeves 93 and 94, one disposed within the other, which may be turned with respect to sleeve 90 and with respect to each other. A ball bearing 95 is mounted on the outer eccentric sleeve 94. The double eccentric formed by the sleeves 93 and 94 is provided at the front thereof with calibrated scales and with adjustment knobs 96 for adjustment of the eccentricity of the double eccentric and for adjustment of its angular position with respect to the sleeve 90.

A reciprocable block 97 rests on the outer race of bearing 95 and is provided at its lower side with a sloping cam surface. Block 97 is held between the arms of a fork 98 and is straddled by bridge member 99 which has a rectangular notch formed in its under side for engagement with the outer race of bearing 95. A triangular lever 100 is pivoted to the carriage 20 at 101 and is provided with two rounded corners one of which bears downwardly on bridge 99, the other corner bearing laterally against a downwardly extending projection of the cross slide which carries the tool 52. The cross slide carrying tool 52 is movable transversely of the bed way by triangular lever 100 and is preferably spring pressed against triangular lever 100 or otherwise resiliently held in engagement therewith.

The shank of fork 98 (Fig. 12) is bifurcated and embraces a block 103 from which a sloping generally elliptical projection 104 extends laterally. Fork 98 is pivotally mounted on a sliding shaft 105 which is held in a U-shaped support 106 as shown in Fig. 17. Shaft 105 has rack teeth formed at one end which mesh with a gear 107. Gear 107 is longitudinally slidably mounted on control rod 33 for rotation therewith, being provided with an internal radially inwardly projecting lug (Fig. 20) which engages a longitudinal slot formed on the under side of control rod 33. A ratchet actuating lever 108 is freely pivotally mounted on control rod 33 adjacent to gear 107. Both gear 107 and lever 108, together with suitable spacers, are laterally held between rearwardly extending projections 109 fixed to plate 68 of carriage apron 50. The ratchet actuating lever 108 is provided with a laterally extending pin 110 of sloping generally elliptical cross-section similar to projection 104 of block 103 and positioned for engagement therewith. Ratchet actuating lever 108 is also provided with a rounded downwardly projecting portion 111 which rests on ratchet advancing pawl 80 (Figs. 20 and 23).

The gears 71 and 91 both mesh with an intermediately disposed gear 112 which is fixed on a revoluble shaft carrying a further gear 113. Gear 113 meshes with a ratchet restoring spring unit comprising an inner cylinder 114 having rack teeth formed thereon for said meshing engagement. Inner cylinder 114 is slidably disposed in an outer cylinder 115 and may be moved upwardly against the yielding pressure of a helical compression spring 116 contained within the inner cylinder 114.

The manual ratchet control lever 55 is arranged to have three positions to which it may be operated and in which it will remain. Lever 55 is provided with two actuating pins 118 and 119 (Figs. 21 and 22). When lever 55 is in its horizontal position, the ratchet mechanism operates in the normal manner. When lever 55 is moved upwardly, pin 118 presses down on ratchet advancing tool 80 preventing it from being actuated by lever 108 (Fig. 21). When lever 55 is moved downwardly, pin 119 engages radial arm 74 of collar 73 and rotates arm 74 in a counterclockwise direction thereby disengaging retaining pawl 83 from ratchet wheel 72 through the action of link 87 (Fig. 22) thereby resetting the ratchet mechanism.

In operation, the double eccentric 93—94 is first adjusted to provide the desired amount of eccentricity which determines the incremental depth of each successive individual cut. The position of the eccentric at the beginning of the first cut is also adjusted so that the initial individual cuts are deeper than the final or finishing cuts. The movable stop pin 77 on perforated wheel 75 is positioned in the proper hole to provide the desired total number of cuts, this being determined by the number of ratchet actuations required to bring pin 77 from its initial position into engagement with the radial arm 74 of collar 73. The stop dogs 36 and 37 are positioned on control rod 33 to provide the desired limits of travel for the carriage 20. The cutting tool is similarly adjusted to provide the desired initial position with respect to the workpiece.

Having thus adjusted the lathe, the workpiece is placed in the chuck 10 and the motor 5 is started. The carriage 20 will move as previously described.

At each reversal of the direction of carriage motion, the control rod 33 is rotated, first in one direction and then in the opposite direction by the action of the helical thread 34 at one end sliding back and forth in the fixed threaded bushing 35. This rotation of control rod 33 causes corresponding rotation of gear 107 and longitudinal movement of the sliding shaft 105 whose rack teeth are in mesh with gear 107.

At the end of a cut, carriage 20 engages stop dog 36 and control rod 33 rotates in a counterclockwise direction as viewed in Figs. 18 and 19. Fork 98, which is mounted on sliding shaft 105, moves to the rights as viewed in Figs. 18 and 19. Reciprocable block 97 rides downwardly on its sloping lower cam surface and the bridge member 99 begins to move with block 97 being moved by fork 98. When the rectangular notch in bridge member 99 reaches the edge of the outer race of bearing 95, the bridge member 99 snaps downwardly and allows triangular lever 100 to rotate in a clockwise direction, whereupon the cutting tool 52 held on the cross slide is abruptly withdrawn from engagement with the workpiece, moving from the position shown in Fig. 18 to the position shown in Fig. 19. At the same time, the carriage 20 begins its rapid traverse return movement, which continues with the cutting tool 52 held withdrawn.

At the end of the rapid traverse movement, carriage 20 engages stop dog 37 and control rod 33 rotates in a clockwise direction as viewed in Fig. 19, whereupon the reciprocable block 97 rides up on its sloping cam surface. After it has risen sufficiently, bridge member 99 is lifted to a point where the rectangular notch is laterally disengaged from the edge of the outer race of bearing 95 and bridge 99 then rests on the upper surface of the outer bearing race. Triangular lever 100 rotates in a clockwise direction through an angle determined by the height of the outer race of ball bearing 95 and this height increases progressively by reason of the action of the double eccentric 93—94 as hereinafter explained. The tool 52 on the cross slide is thus advanced a greater distance at each successive cut, the increments in distance being determined by the angular position of the double eccentric 93—94.

The progressive rotation of the double eccentric 93—94 is obtained by actuation of the ratchet mechanism. At the end of a cut, when control rod 33 rotates in a counterclockwise direction, the block 103 with its lateral elliptical projection 104 will move to the right as viewed in Fig. 20. The projection 104, by reason of its sloping elliptical cross-section will ride under the similarly shaped pin 110 carried by ratchet actuating lever 108, lifting the lever 108. At the end of the rapid traverse movement of the carriage 20, the block 103 with its projection 104 will move to the left in response to the clockwise rotation of control rod 33. The projection 104 now rides over pin 110 momentarily forcing ratchet actuating lever 108 downwardly so that its lower portion 111 forces ratchet advancing pawl 80 down against ratchet wheel 72 thereby advancing the ratchet wheel 72 by one tooth. The retaining pawl 83 holds the ratchet wheel 72 in this advanced position.

With each advance of the ratchet wheel 72, the perforated wheel 75 is advanced through the same angle, bringing the movable stop pin 77 nearer to the radial arm 74 of collar 73. Each advance also rotates the double eccentric 93—94 through a predetermined angle through the gearing 71—112—91 to raise the height of the outer race of ball bearing 95, and thus incrementally increase the amount by which the tool 52 is advanced during the cutting movement of the carriage. Rotation of gear 112 also causes rotation of gear 113 mounted on the same shaft, gear 113 meshing with the ratchet restoring spring unit 114—115—116. The spring 116 is thus compressed and will act to restore the ratchet mechanism and the double eccentric 93—94 when retaining pawl 83 is released.

After the ratchet wheel 72 has advanced to a point where movable pin 77 engages the radial arm 74 of collar 73, the pawl 83 will be released through the action of link 87 as the arm 74 is moved in a counterclockwise direction as viewed in Figs. 21 and 22. The projection 82 from ratchet advancing pawl 80 is engaged by the back of retaining pawl 83 thereby also withdrawing the ratchet advancing pawl 80 from engagement with ratchet wheel 72 and permitting ratchet wheel 72 to return freely to its initial position under the influence of compression spring 116.

At the time when pawl 83 is released, the contact member 85 which is secured thereto engages a pair of electrical contacts 120 (Fig. 21) which are connected in a suitable circuit (not shown) to stop the motor 5. The machine may also be similarly stopped at any time by operation of ratchet control lever 55 to its downward position as shown in Fig. 22.

Provisions for the cutting of non-cylindrical threads is included in the lathe of the present invention. A longitudinal rail 121 (Figs. 18 and 19) extends beneath the roller 122 which is secured to movable pivoted plate 68 of apron 50. By loosening the bolts 69, the plate 68 is free to rotate to a limited extent about pivot pin 70. The configuration of the upper surface of rail 121 is arranged to give the desired departure from a cylindrical thread. A straight rail with a slight incline will produce a conically tapering thread. The variation introduced by the rail 121 will be followed with the successive increments in tool advance introduced by the double eccentric 93—94, since bridge member 99 moves vertically in accordance with the angular displacements of plate 68.

I have shown and described a single embodiment of my invention. It is to be understood, however, that many changes and modifications thereof will be apparent to those skilled in the art but which will not depart from the scope of the invention as defined in the appended claims.

What I claim is:

1. A lathe construction comprising, a tool carriage, means for mounting said carriage for movement, a rotatable lead screw threadedly engaging said carriage for causing said movement, tool holding means carried by said tool carriage transversely movably with respect thereto for selectively feeding a cutting tool into cutting engagement with a workpiece and for withdrawing said tool, drive means, two oppositely rotating members driven by said drive means and clutch means directly coupled to said lead screw for causing said rotation thereof, said clutch means being selectively engageable with either one of said oppositely rotating members for controlling the direction of rotation of said lead screw and the resulting direction of movement of said tool carriage, a control rod member rotatably and axially slidably extending parallel to and spaced from said lead screw, helical means of high pitch connected with a portion of said rod member for causing rotational movement of said rod member in response to axial movement thereof, stop dog means carried by said rod member and disposed at opposite sides of said carriage for alternate engagement thereby to cause axial movement of said rod member alternately in opposite directions, means connecting said rod member to said clutch means for reversing the direction of rotation of said lead screw in response to axial movement of said rod member, tool control means movable with said carriage and connected with said tool holding means, including means mounting said tool control means for slidable movement on said rod member and for actuation in response to rotation thereof, a first means included in said tool control means and responsive to rotation of said rod member in one direction for causing movement of said tool holding means to bring said tool into cutting engagement with said workpiece, and a second means including snap action means included in said tool control means and responsive to rotation of said rod member in the other direction for causing movement of said tool holding means to withdraw said cutting tool abruptly from engagement with said workpiece.

2. A lathe construction according to claim 1, in which said tool control means comprises rack and pinion means for causing movement of said tool into and withdrawal of said tool from said cutting engagement with said workpiece in response to respective opposite rotational movements of said rod member, the pinion portion of said rack and pinion means being mounted for slidable movement on said rod member and being keyed thereto for rotation therewith; wherein said first means of said tool control means comprises a first slide member actuated by the rack portion of said rack and pinion means and having a sloping cam surface for progressively feeding said cutting tool into said cutting engagement; and in which said second means of said tool control means comprises a second slide member actuated by and cooperating with said first slide member, said second slide member having two separate surfaces one of which by-passes said sloping cam surface during movement of said first slide member in the tool withdrawal direction and the other of which provides for said snap action.

3. A lathe construction according to claim 1, further comprising ratchet means mounted on said tool carriage and actuated in response to successive movements of said rod member, adjustable eccentric means mounted on said tool carriage and connected for step by step rotation by said ratchet means, and means connecting said eccentric means to said tool control means for progressively changing the position of said cutting tool when in cutting engagement with said workpiece to provide for successive cuts.

4. A lathe construction according to claim 3, further comprising stop means actuated by said ratchet means and connected to said drive means for stopping cutting operation of said cutting tool after a predetermined number of cuts.

5. A lathe construction according to claim 1, further comprising a fixed guide member having an elongated guide surface which is angularly inclined with respect to the direction of movement of said tool carriage, said tool control means further comprising means engaging said guide surface and connected to said tool holding means for displacement of said tool to cut a non-cylindrical helical thread.

References Cited in the file of this patent

UNITED STATES PATENTS

| 796,171 | Ambrose | Aug. 1, 1905 |
| 2,576,570 | Castelli | Nov. 27, 1951 |
| 2,709,924 | Castelli | June 7, 1955 |

FOREIGN PATENTS

| 717,361 | Germany | Feb. 12, 1942 |
| 671,252 | Great Britain | Apr. 30, 1952 |